No. 842,070. PATENTED JAN. 22, 1907.
E. J. B. BROCHERIOUX, P. J. TOCHON, A. FORTIER & L. V. MAROTTE.
COMPOSITION FOR SOUND RECORDS.
APPLICATION FILED OCT. 12, 1905.
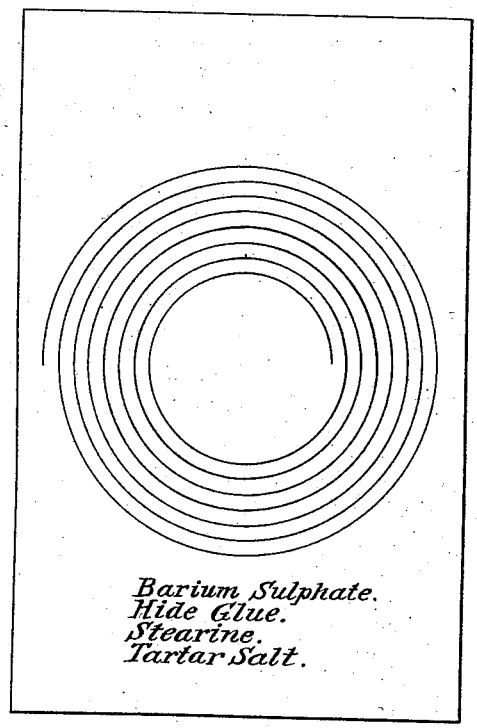
Barium Sulphate.
Hide Glue.
Stearine.
Tartar Salt.
WITNESSES:
W. M. Avery
Walton Harrison.
INVENTORS
Emilien J. B. Brocherioux
Paul J. Tochon
Alfred Fortier
Leon V. Marotte
BY
Munn & Co
ATTORNEYS

UNITED STATES PATENT OFFICE.

EMILIEN JEAN BAPTISTE BROCHERIOUX, PAUL JOSEPH TOCHON, ALFRED FORTIER, AND LEON VICTOR MAROTTE, OF PARIS, FRANCE.

COMPOSITION FOR SOUND-RECORDS.

No. 842,070.     Specification of Letters Patent.     Patented Jan. 22, 1907.

Application filed October 12, 1905. Serial No. 282,498.

*To all whom it may concern:*

Be it known that we, EMILIEN JEAN BAPTISTE BROCHERIOUX, publisher, of 23 Quai Voltaire, PAUL JOSEPH TOCHON, merchant, of 3 Rue des Deux-Boules, ALFRED FORTIER, printer, of 35 Rue Jussieu, and LEON VICTOR MAROTTE, printer, of 35 Rue Jussieu, in the city of Paris, Republic of France, have invented a Composition for Sound-Records, of which the following is a full, clear, and exact description.

The object of this invention is the production of a special composition designed to be applied to the surface of paper, cardboard, pasteboard, and other substances to form a film or coating on which sounds may be recorded and subsequently reproduced by means of a phonograph.

The invention is especially suitable for the production of phonogram-cards and postal phonogram-cards or cards which bearing the record may be forwarded by post and read by the recipient by means of a phonograph.

The composition is composed of permanent white, (barium sulfate,) zinc-white, (light oxid of zinc,) and a special encaustic, (made by dissolving stearin in water in the presence of salt of tartar,) hide-glue, and water in the following proportions: permanent white, 0.250 kilograms; zinc-white, 0.125 kilogram; encaustic, 0.250 kilogram; glue, 0.187 kilogram; water, one-half liter.

The encaustic is itself prepared according to the following formula: stearin, two kilograms; salt of tartar, 0.125 kilogram; water, forty liters.

In preparing the composition we proceed as follows: First, the permanent white, the encaustic, the zinc-white, and the water are mixed, and the ingredients are incorporated or blended together until the whole becomes a homogeneous mass. Second, the glue dissolved in a water-bath is then added. Third, the mixture is then strained. This composition is applied in layers spread by means of a brush, one coat being allowed to dry before the next is applied. The card or surface thus coated is rolled or surfaced either by being subjected to pressure between metal plates—zinc plates, for example—or passed between calendering-rolls.

The constituent elements of the above-mentioned composition may be replaced by their chemical equivalents or analogues; but in order to impart to the composition the requisite qualities it is necessary that it should contain all the substances mentioned or their substitutes.

The sulfate of baryta may be replaced by one or several of the following substances— viz., either the sulfate or the carbonate of lead or by precipitated calcium sulfate, as well as, but less efficaciously, by carbonate of baryta, precipitated sulfate of strontium, or precipitated carbonate of strontium or carbonate of lime. The light oxid of zinc may be replaced by the precipitated oxid, sulfid, or carbonate or by kaolin, talc, calcined English magnesia, carbonate of magnesia, or precipitated alumina.

Instead of hide-glue we may employ fish-glue, paste, dextrine, or gelatin; but hide-glue is preferable, as it renders the coating softer and more supple.

We claim—

1. The herein-described composition of matter, consisting of permanent white, zinc-white, stearin, salt of tartar, glue and water admixed into a paste.

2. The composition herein described, consisting of permanent white and encaustic zinc-white and glue.

The foregoing specification of our composition for application to paper, cardboard, and other substances to form a coating for recording and reproducing sounds phonographically signed by us this 27th day of September, 1905.

EMILIEN JEAN BAPTISTE BROCHERIOUX.
    PAUL JOSEPH TOCHON.
    ALFRED FORTIER.
    LEON VICTOR MAROTTE.

Witnesses:
    HANSON C. COXE,
    GEORGES CHARLES COQUET.